(12) United States Patent
Meijer (10) Patent No.: US 11,319,758 B2
(45) Date of Patent: May 3, 2022

(54) CONNECTION SYSTEM FOR A WELL STRING

(71) Applicant: OneSubsea IP UK Limited, London (GB)

(72) Inventor: John R. Meijer, Sugar Land, TX (US)

(73) Assignee: ONESUBSEA IP UK LIMITED, London (GB)

( * ) Notice: Subject to any disclaimer, the term of this patent is extended or adjusted under 35 U.S.C. 154(b) by 132 days.

(21) Appl. No.: 16/911,734

(22) Filed: Jun. 25, 2020

(65) Prior Publication Data

US 2020/0408046 A1 Dec. 31, 2020

Related U.S. Application Data

(60) Provisional application No. 62/866,087, filed on Jun. 25, 2019, provisional application No. 62/866,081, filed on Jun. 25, 2019.

(51) Int. Cl.
| | |
|---|---|
| *E21B 17/02* | (2006.01) |
| *E21B 34/06* | (2006.01) |
| *F16F 1/32* | (2006.01) |
| *E04G 17/04* | (2006.01) |

(52) U.S. Cl.
CPC ............. *E21B 17/02* (2013.01); *E21B 34/06* (2013.01); *F16F 1/32* (2013.01); *E04G 17/042* (2013.01); *E21B 2200/04* (2020.05)

(58) Field of Classification Search
CPC ...... E21B 17/02; E21B 34/06; E21B 2200/04; E21B 33/00; E04G 17/042; F16F 1/32
See application file for complete search history.

(56) References Cited

U.S. PATENT DOCUMENTS

| | | | | |
|---|---|---|---|---|
| 4,111,568 A | | 9/1978 | Wing | |
| 4,398,555 A | * | 8/1983 | Taylor | E21B 43/123 137/155 |
| 5,186,501 A | * | 2/1993 | Mano | F16L 19/005 285/89 |
| 5,458,214 A | * | 10/1995 | Olson | A62B 35/0056 182/18 |
| 5,671,799 A | * | 9/1997 | Merrill | B22D 18/04 164/151 |
| 6,302,633 B1 | | 10/2001 | Poe | |
| 6,322,390 B1 | * | 11/2001 | Takeuchi | H01R 24/542 439/289 |

(Continued)

OTHER PUBLICATIONS

Combined Search and Examination Report issued in British Patent Application No. GB2009719.2 dated Mar. 30, 2021; 10 pages.

*Primary Examiner* — Yong-Suk (Philip) Ro
(74) *Attorney, Agent, or Firm* — Eileen Pape (57) ABSTRACT

A connection system includes a turnbuckle having a first set of threads and a second set of threads disposed on an inner surface of the turnbuckle. The turnbuckle is configured to couple two threaded components to one another via rotation of the turnbuckle in a first direction. In addition, the connection system includes a compression washer configured to compress as the turnbuckle rotates in the first direction. The compression washer is configured to apply a longitudinal force to the turnbuckle while the compression washer is compressed to increase resistance to rotation of the turnbuckle in a second direction, opposite the first direction.

20 Claims, 5 Drawing Sheets

(56) References Cited

U.S. PATENT DOCUMENTS

| | | | |
|---|---|---|---|
| 7,108,063 B2 | 9/2006 | Carstensen | |
| 2004/0163820 A1* | 8/2004 | Bishop | E21B 34/06 |
| | | | 166/373 |
| 2009/0056476 A1* | 3/2009 | Glass | G01L 5/06 |
| | | | 73/862.391 |
| 2011/0140322 A1* | 6/2011 | Reeves | F27D 1/0023 |
| | | | 266/275 |
| 2020/0318368 A1* | 10/2020 | Mesner | E04G 25/065 |

* cited by examiner

CONNECTION SYSTEM FOR A WELL STRING

CROSS-REFERENCE TO RELATED APPLICATION

This application claims priority to and the benefit of U.S. Provisional Application No. 62/866,087, entitled "Turnbuckle for use in subsea landing string" filed Jun. 25, 2019, and U.S. Provisional Application No. 62/866,081, entitled "Back off prevention connection for use in subsea landing string" filed Jun. 25, 2019 which are hereby incorporated by reference in their entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. In various subsea applications and other well applications, multiple components (e.g., valve assemblies, plugs, mandrels, etc.) are coupled to one another to form a well string (e.g., subsea landing string). For example, a valve assembly may include a housing and a lower end cap that are coupled to one another by a turnbuckle. The housing may have threads on an outer surface, the lower end cap may have threads on an outer surface, and the turnbuckle may have threads on an inner surface. The threads of the turnbuckle may be engaged with the threads of the housing and the threads of the lower end cap. Rotation of the turnbuckle in a first direction draws the lower end cap toward the housing until the lower end cap is engaged with the housing. The turnbuckle then maintains the connection between the lower end cap and the housing. However, rotation and vibration within the well string may drive the turnbuckle to rotate in a second direction, opposite the first direction, thereby causing the lower end cap to partially disengage the housing.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
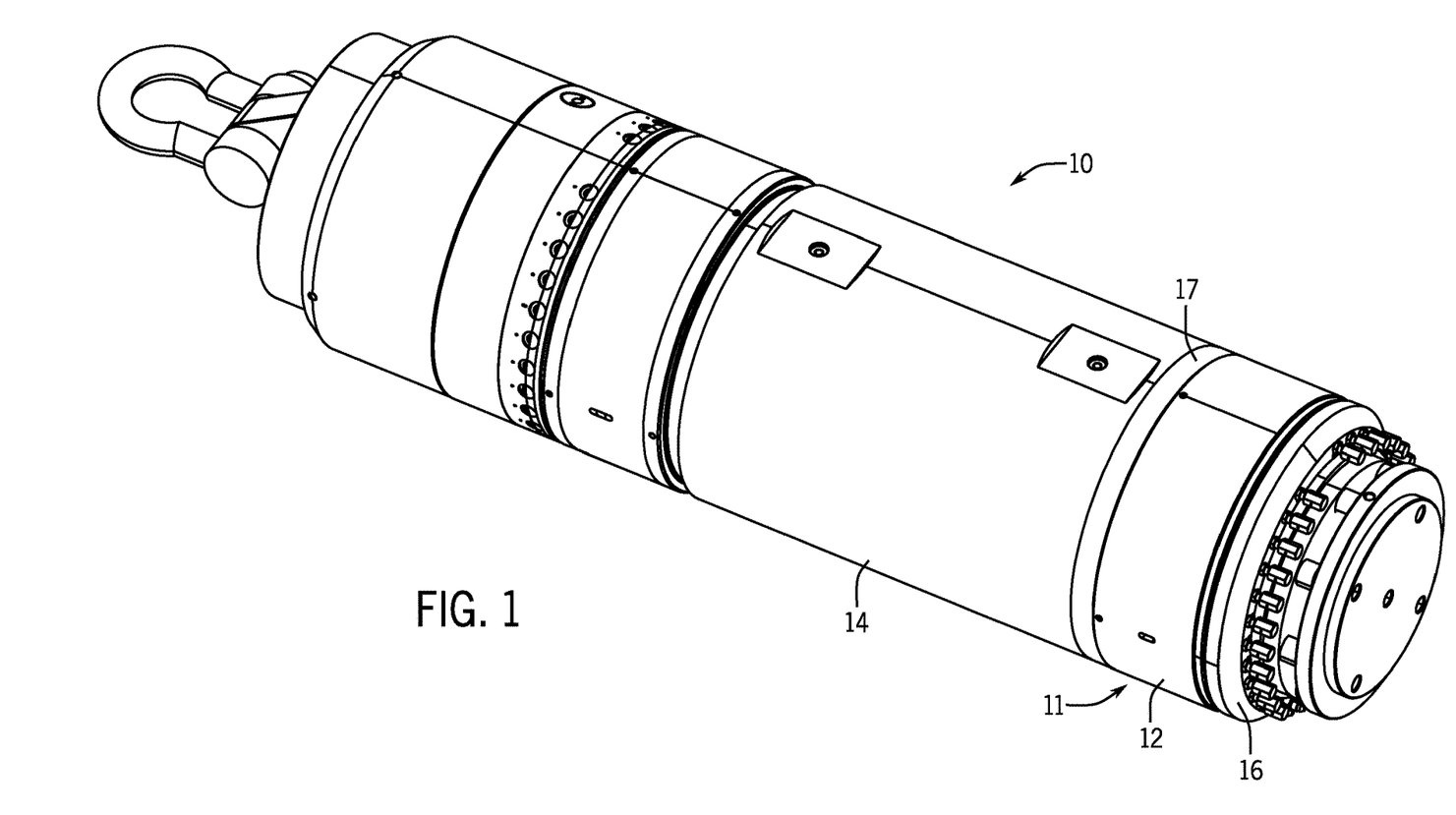
FIG. 1 is a perspective view of an embodiment of a valve assembly having a connection system.

FIG. 1 is a perspective view of an embodiment of a valve assembly 10 having a connection system 11. In certain embodiments, the valve assembly 10 may be disposed along a well string, such as a landing string. For example, the valve assembly 10 may be used as a retainer valve within a subsea landing string. The valve assembly 10 may include a ball configured to rotate between an open position that facilitates fluid flow through the valve assembly and a closed position that blocks fluid flow through the valve assembly. The ball may be driven to rotate by an actuator assembly (e.g., including one or more hydraulic pistons configured to drive the ball to the open position and to the closed position). In certain embodiments, the valve assembly may include a spring configured to urge the ball to the closed position in response to interruption in operation of the actuator assembly. In such embodiments, the valve assembly is considered a failsafe closed valve assembly.

In the illustrated embodiment, the connection system 11 includes a turnbuckle 12 configured to couple a housing 14 and a lower end cap 16 to one another. As discussed in detail below, the turnbuckle 12 has a first set of threads and a second set of threads disposed on an inner surface of the turnbuckle. The first set of threads is configured to engage threads on an outer surface of the housing 14, and the second set of threads is configured to engage threads on an outer surface of the lower end cap 16. In addition, the turnbuckle 12 is configured to couple the lower end cap 16 to the housing 14 via rotation of the turnbuckle 12 in a first direction. The connection system 11 also includes a compression washer 17 disposed about the housing 14. The compression washer 17 is configured to compress between the turnbuckle and a shoulder of the housing as the turnbuckle rotates in the first direction. In addition, the compression washer is configured to apply a longitudinal force to the turnbuckle while the compression washer is compressed to increase resistance to rotation of the turnbuckle in a second direction, opposite the first direction. As a result, the possibility of partial disengagement of the lower end cap from the housing (e.g., due to vibrations and/or rotations causing the turnbuckle to rotate in the second direction) may be substantially reduced or eliminated.

While the valve assembly disclosed above is a failsafe closed ball valve assembly, the connection system disclosed herein may be used within any other suitable valve assembly (e.g., a flapper valve assembly, a failsafe open valve assembly, etc.). Furthermore, while the connection system is disclosed herein with reference to coupling a lower end cap to a housing of the valve assembly, the connection system may be utilized to couple any suitable components of a valve assembly to one another. Furthermore, the connection system disclosed herein may be used to couple any two suitable components having threads to one another (e.g., such as other components within a well string, components in which at least one component has a fluid pathway extending through the component, etc.).

Figure 2:
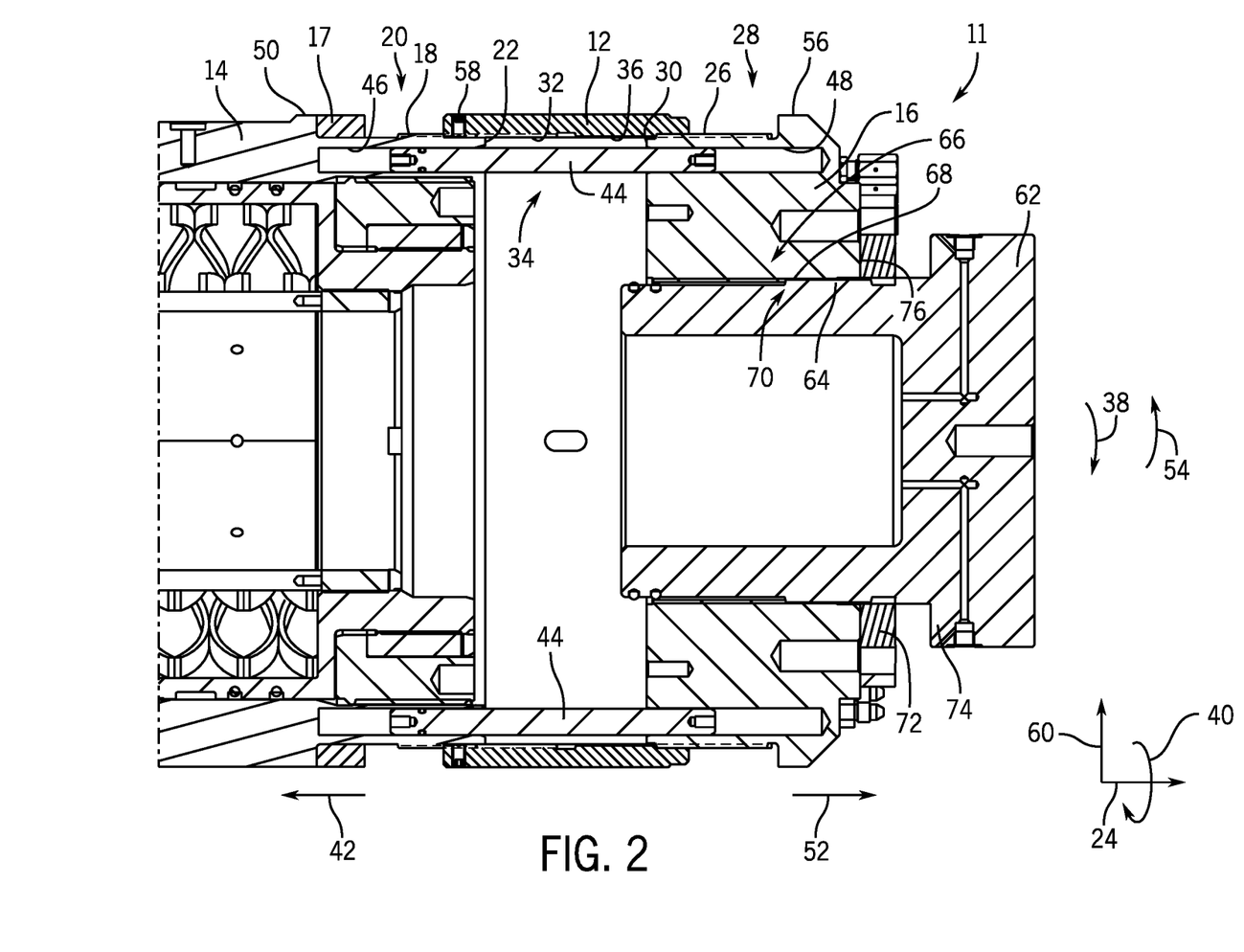
FIG. 2 is a cross-sectional view of an embodiment of a connection system that may be employed within the valve assembly of FIG. 1, in which the connection system includes a turnbuckle configured to couple two component to one another.

FIG. 2 is a cross-sectional view of an embodiment of a connection system 11 that may be employed within the valve assembly of FIG. 1. In the illustrated embodiment, the turnbuckle 12 (e.g., annular turnbuckle) is configured to couple the lower end cap 16 (e.g., annular lower end cap) and the housing 14 (e.g., annular housing) to one another. In certain embodiment, the lower end cap 16 is configured to form a port (e.g., to downhole tubing) of the valve assembly. The turnbuckle 12 is configured to couple the lower end cap 16 to the housing 14 during formation of the valve assembly, and the turnbuckle 12 is configured to maintain the connection between the lower end cap 16 and the housing 14 during operation of the valve assembly.

As illustrated, the housing 14 has threads 18 on an outer surface 20 of the housing 14 (e.g., disposed about a fluid passage through the housing). In the illustrated embodiment, the threads 18 extend to a longitudinal end 22 of the housing 14 (e.g., end of the housing 14 along a longitudinal axis 24 of the connection system 11). However, in other embodiments, the threads may be longitudinally offset (e.g., offset along the longitudinal axis) from the longitudinal end of the housing. In addition, the lower end cap 16 has threads 26 on an outer surface 28 of the lower end cap 16 (e.g., disposed about a fluid passage through the lower end cap). In the illustrated embodiment, the threads 26 extend to a longitudinal end 30 of the lower end cap 16 (e.g., end of the lower end cap 16 along the longitudinal axis 24). However, in other embodiments, the threads may be longitudinally offset (e.g., offset along the longitudinal axis) from the longitudinal end of the lower end cap.

The turnbuckle 12 has a first set of threads 32 disposed on an inner surface 34 of the turnbuckle 12, and the turnbuckle 12 has a second set of threads 36 disposed on the inner surface 34 of the turnbuckle 12. The first set of threads 32 and the second set of threads 36 are positioned on opposite longitudinal sides of the turnbuckle 12. The first set of threads 32 is configured to engage the threads 18 of the housing 14, and the second set of threads 36 is configured to engage the threads 26 of the lower end cap 16. The turnbuckle 12 is configured to couple the lower end cap 16 to the housing 14 via rotation of the turnbuckle 12 in a first rotational direction 38 (e.g., first direction along a circumferential axis 40). For example, in certain embodiments, the first set of threads 32 are left-handed, and the second set of threads 36 are right-handed. In addition, the threads 18 of the housing 14 are left-handed, and the threads 26 of the lower end cap 16 are right-handed. Accordingly, rotating the turnbuckle 12 in the first rotational direction 38 drives the turnbuckle 12 to move along a first translational direction 42 toward the housing 14. In addition, rotating the turnbuckle 12 in the first rotational direction 38 drives the lower end cap 16 toward the turnbuckle 12 and the housing 14. The turnbuckle 12 may be rotated in the first rotational direction 38 until the lower end cap 16 engages the housing. While the first set of threads 32 of the turnbuckle 12 and the threads 18 of the housing 14 are left-handed, and the second set of threads 36 of the turnbuckle 12 and the threads 26 of the lower end cap 16 are right-handed in the illustrated embodiment, in other embodiments, the first set of threads of the turnbuckle and the threads of the housing may be right-handed, and the second set of threads of the turnbuckle and the threads of the lower end cap may be left-handed. In such embodiments, the turnbuckle may be rotated in the opposite rotational direction to couple the lower end cap to the housing.

In the illustrated embodiment, the connection system 11 includes alignment rods 44, in which each alignment rod 44 extends into a respective recess 46 within the housing 14 and into a respective recess 48 within the lower end cap 16. The connection system 11 may include any suitable number of alignment rods 44 (e.g., 1, 2, 3, 4, 5, 6, 7, 8, or more), and the alignment rods 44 may be distributed about the circumferential axis 40. The alignment rods 44 are configured to facilitate alignment of the lower end cap 16 with the housing 14 during the formation of the valve assembly. While the connection system includes alignment rods in the illustrated embodiment, in other embodiments, the alignment rods may be omitted.

In the illustrated embodiment, the connection system 11 includes at least one compression washer 17 (e.g., annular compression washer(s)) disposed about the housing 14 (e.g., disposed about the entire circumferential extent of the housing 14). The compression washer may be disposed about the threads of the housing or about a portion of the outer surface of the housing that does not include threads. The compression washer 17 is configured to compress between the turnbuckle 12 and a shoulder 50 of the housing 14 as the turnbuckle rotates in the first rotational direction 38 (e.g., as the turnbuckle 12 engages the compression washer 17 and continues movement in the first translational direction 42). The compression washer 17 is configured to apply a longitudinal force (e.g., force along the longitudinal axis 24) to the turnbuckle 12 in a second translational direction 52 while the compression washer 17 is compressed. The force applied by the compression washer 17 to the turnbuckle 12 increases the friction between the threads of the turnbuckle and the threads of the housing and lower end cap, thereby increasing resistance to rotation of the turnbuckle in a second rotational direction 54. As a result, the possibility of the turnbuckle rotating in the second rotational direction in response to vibration and/or rotation of the valve assembly is substantially reduced or eliminated, thereby substantially reducing or eliminating the possibility of unintentional separation of the lower end cap from the housing.

By way of example, to couple the lower end cap 16 to the housing 14, the compression washer 17 may be disposed about the outer surface 20 of the housing 14. The first set of threads 32 of the turnbuckle 12 may then be engaged with the threads 18 of the housing 14. Next, the threads 26 of the lower end cap 16 may be engaged with the second set of threads 36 of the turnbuckle 12. The turnbuckle 12 may then be rotated in the first rotational direction 38 to move the turnbuckle 12 toward the compression washer 17 along the first translational direction 42 and to move the lower end cap 16 toward the housing 14 along the first translational direction 42. Continued rotation of the turnbuckle 12 in the first rotational direction 38 drives the turnbuckle 12 to compress the compression washer 17. As previously discussed, compression of the compression washer 17 causes the compression washer to apply a longitudinal force to the turnbuckle 12 to increase resistance to rotation of the turnbuckle 12 in the second rotational direction 54.

As discussed in detail below, the compression washer(s) may include any suitable washer(s) configured to apply a force to the turnbuckle in response to compression by the washer(s). For example, the compression washer(s) may include a helical spring washer, a conical washer, a wedge-lock washer, another suitable compression washer, or a combination thereof. For example, in certain embodiments, a single compression washer may be disposed between the turnbuckle 12 and the shoulder 50 of the housing. However, in other embodiments, multiple compression washers (e.g., of the same type or of different types) may be disposed between the turnbuckle and the shoulder of the housing (e.g., stacked on top of one another along the longitudinal axis). Furthermore, in certain embodiments, one or more compression washers may be disposed between the turnbuckle 12 and a shoulder 56 of the lower end cap 16 (e.g., alone or in combination with one or more washers disposed between the turnbuckle and the shoulder of the housing). For example, one or more helical spring washers, one or more conical washers, one or more wedge-lock washers, one or more other suitable compression washers, or a combination thereof, may be disposed between the turnbuckle 12 and the shoulder 56 of the lower end cap 16.

In the illustrated embodiment, multiple radial set screws 58 extend through the turnbuckle 12 along a radial axis 60 of the connection system 11 and engage the housing 14. For example, the radial set screws may be engaged with the outer surface of the housing after the turnbuckle compresses the compression washer. Contact between the radial set screws 58 and the outer surface 20 of the housing 14 may further increase the resistance to rotation of the turnbuckle 12, thereby further reducing the possibility of unintentional rotation of the turnbuckle. In certain embodiments, the radial set screws 58 are distributed about the turnbuckle 12 along the circumferential axis 40. The connection system may include any suitable number of radial set screws (e.g., 1, 2, 3, 4, 5, 6, 7, 8, 9, 10, or more). In addition, while the radial set screws are configured to engage the housing in the illustrated embodiment, in other embodiments, one or more radial set screws may engage the lower end cap (e.g., alone or in combination with one or more radial set screws that engage the housing). Furthermore, in certain embodiments, the set radial screws may be omitted.

In the illustrated embodiment, the first set of threads 32 of the turnbuckle 12 includes stub Acme threads, and the second set of threads 36 of the turnbuckle 12 includes stub Acme threads. In addition, the threads 18 on the outer surface 20 of the housing 14 and the threads 26 on the outer surface 28 of the lower end cap 16 include corresponding stub Acme threads. Stub Acme threads have the same shape on each side of the thread flank. In addition, stub Acme threads may support a significant longitudinal load between the turnbuckle and the housing/lower end cap. As a result, the lower end cap 16 may be coupled to the housing 14 with a significant force, thereby further increasing the friction between the threads. Accordingly, the possibility of unintentional rotation of the turnbuckle may be further reduced. While the first set of threads 32 of the turnbuckle 12/threads 18 of the housing 14 and the second set of threads 36 of the turnbuckle 12/threads 26 of the lower end cap 16 include stub Acme threads in the illustrated embodiment, in other embodiments, at least one of the first set of threads of the turnbuckle/threads of the housing or the second set of threads of the turnbuckle/threads of the lower end cap may include another suitable type of threads (e.g., buttress threads, trapezoidal threads, Acme threads, etc.).

As illustrated, a test plug or crossover 62 is partially engaged with the lower end cap 16. In the illustrated embodiment, the test plug/crossover 62 has threads 64 (e.g., pin threads) disposed on an outer surface 66 of the test plug/crossover 62 (e.g., disposed about a fluid passage through the test plug/crossover). In addition, the lower end cap 16 has threads 68 (e.g., box threads) disposed on an inner surface 70 of the lower end cap 16. The threads 64 of the test plug/crossover 62 and the threads 68 of the lower end cap 16 may be any suitable type of threads (e.g., trapezoidal threads, Acme threads, stub Acme threads, buttress threads, etc.). The test plug/crossover 62 may be coupled to the lower end cap 16 via engagement of the corresponding threads and rotation of the test plug/crossover 62 in the second rotational direction 54.

In the illustrated embodiment, the connection system 11 includes at least one second compression washer 72 (e.g., annular compression washer(s)) that is disposed about the test plug/crossover 62 and positioned between a head 74 of the test plug/crossover 62 and a face 76 of the lower end cap 16. The second compression washer may be disposed about the threads of the test plug/crossover or about a portion of the outer surface of the test plug/crossover that does not include threads. The second compression washer 72 is configured to compress between the test plug/crossover 62 and the lower end cap 16 as the test plug/crossover 62 rotates in the second rotational direction 54 (e.g., as the head 74 of the test plug/crossover 62 engages the second compression washer 72 and continues movement in the first translational direction 42). The second compression washer 72 is configured to apply a longitudinal force (e.g., force along the longitudinal axis 24) to the test plug/crossover 62 in the second translational direction 52 while the second compression washer 72 is compressed. The force applied by the second compression washer 72 to the test plug/crossover 62 increases the friction between the threads of the test plug/crossover and the corresponding threads of the lower end cap, thereby increasing resistance to rotation of the test plug/crossover 62 in the first rotational direction 38. As a result, the possibility of the test plug/crossover 62 rotating in the first rotational direction in response to vibration and/or rotation of the valve assembly is substantially reduced or eliminated, thereby substantially reducing or eliminating the possibility of unintentional separation of the test plug/crossover from the lower end cap. While the threads of the test plug/crossover and the corresponding threads of the lower end cap are oriented such that rotation of the test plug/crossover in the second rotational direction causes the test plug/crossover to move in the first translation direction, in other embodiments, the threads of the test plug/crossover and the corresponding threads of the lower end cap may be oriented such that rotation of the test plug/crossover in the first rotational direction causes the test plug/crossover to move in the first translational direction. Furthermore, while the test plug/crossover has threads on the outer surface (e.g., pin threads), and the lower end cap has corresponding threads on the inner surface (e.g., box threads), in other embodiments, the test plug/crossover may have threads on the inner surface (e.g., box threads), and the lower end cap may have corresponding threads on the outer surface (e.g., pin treads). In such embodiments, the second compression washer may be disposed about the outer surface of the lower end cap.

As discussed in detail below, the second compression washer(s) may include any suitable washer(s) configured to apply a force to the test plug/crossover in response to compression by the test plug/crossover. For example, the second compression washer(s) may include a helical spring washer, a conical washer, a wedge-lock washer, another suitable compression washer, or a combination thereof. For example, in certain embodiments, a single second compression washer may be disposed between the head 74 of the test plug/crossover 62 and the face 76 of the lower end cap 16. However, in other embodiments, multiple second compression washers (e.g., of the same type or of different types) may be disposed between the head of the test plug/crossover and the face of the lower end cap (e.g., stacked on top of one another along the longitudinal axis).

While the second compression washer 72 is disposed about the test plug/crossover in the illustrated embodiment, in other embodiments, the second compression washer may be omitted. Furthermore, in certain embodiments, a compression washer may be disposed about any other suitable component of the valve assembly having threads on an outer surface of the component (e.g., pin threads) that are configured to engage corresponding threads on the inner surface of another component (e.g., box threads). In addition, in certain embodiments, a compression washer may be disposed about a first component of another suitable assembly (e.g., a well string component, etc.) having threads on an outer surface of the first component that are configured to engage corresponding threads on the inner surface of a second component (e.g., in which the outer surface of the first component surrounds a fluid flow path through the first component, and/or in which the inner surface of the second component is disposed about a fluid flow path through the second component).

Figure 3:
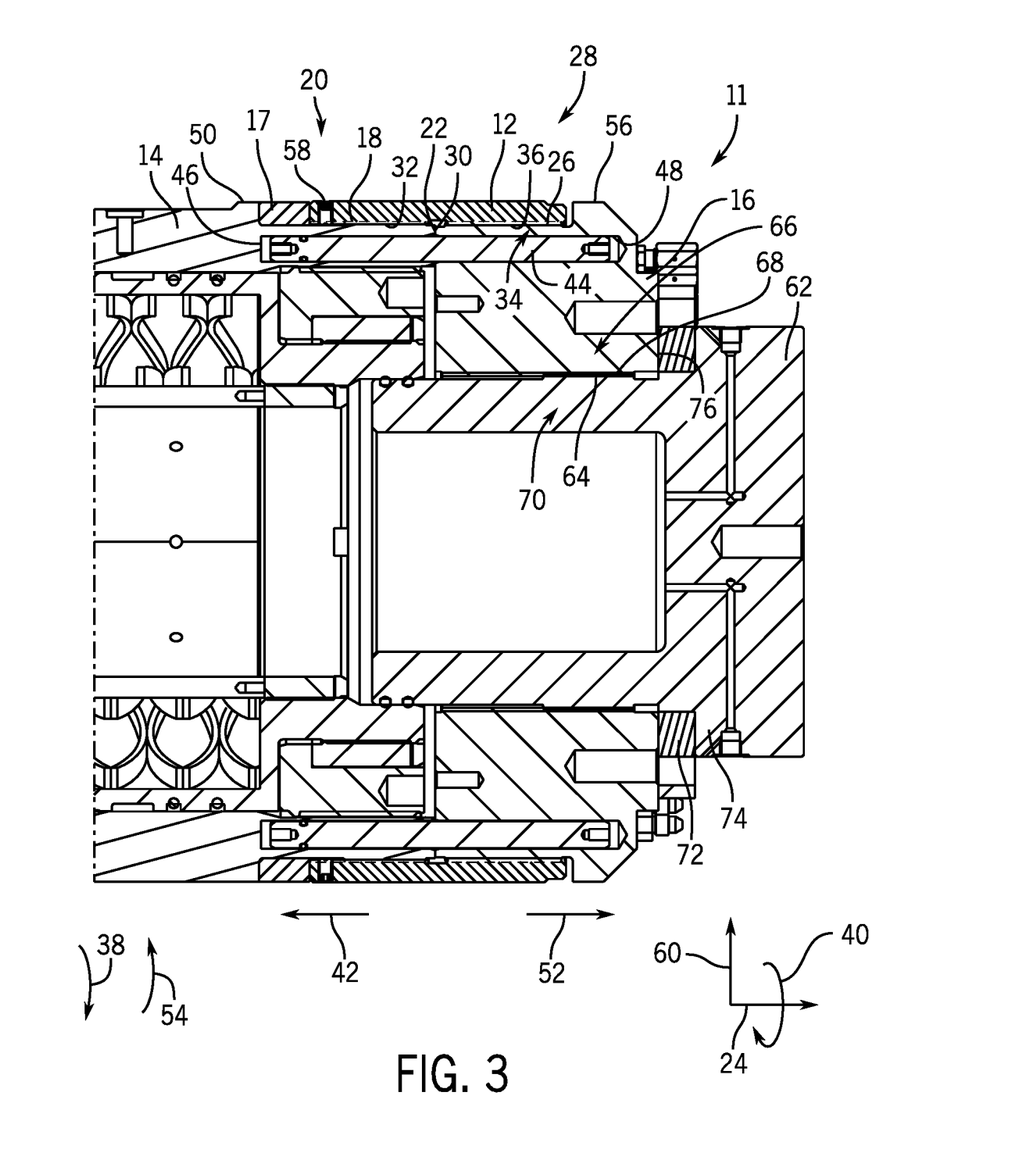
FIG. 3 is a cross-sectional view of the connection system of FIG. 2, in which the two components are engaged with one another.

FIG. 3 is a cross-sectional view of the connection system 11 of FIG. 2, in which the housing 14 and the lower end cap 16 are engaged with one another. As previously discussed, rotation of the turnbuckle 12 in the first rotational direction 38 drives the turnbuckle 12 to move along the first translational direction 42 relative to the housing 14, and rotation of the turnbuckle 12 in the first rotational direction 38 drives the lower end cap 16 toward the turnbuckle 12 and the housing 14. As illustrated, the longitudinal end 22 of the housing 14 is in contact with the longitudinal end 30 of the lower end cap 16. In addition, the compression washer 17 is compressed between the turnbuckle 12 and the shoulder 50 of the housing 14. Accordingly, the compression washer 17 applies a longitudinal force to the turnbuckle 12 in the second translational direction 52. As previously discussed, the force applied by the compression washer 17 to the turnbuckle 12 increases the friction between the threads of the turnbuckle and the threads of the housing and lower end cap, thereby increasing resistance to rotation of the turnbuckle in the second rotational direction 54. As a result, the possibility of the turnbuckle rotating in the second rotational direction in response to vibration and/or rotation of the valve assembly is substantially reduced or eliminated, thereby substantially reducing or eliminating the possibility of unintentional separation of the lower end cap from the housing. Rotation of the turnbuckle 12 in the first rotational direction 38 is blocked by contact between the turnbuckle and the compression washer 17.

Furthermore, the radial set screws 58 extend through the turnbuckle 12 and engage the housing 14. As previously discussed, contact between the radial set screws 58 and the outer surface 20 of the housing 14 further increases the resistance to rotation of the turnbuckle 12, thereby further reducing the possibility of unintentional rotation of the turnbuckle. However, as previously discussed, the radial set screws may be omitted in certain embodiments.

Furthermore, the test plug/crossover 62 is engaged with the lower end cap 16. As illustrated, the second compression washer 72 is compressed between the head 74 of the test plug/crossover 62 and the face 76 of the lower end cap 16. Accordingly, the second compression washer 72 applies a longitudinal force to the test plug/crossover 62 in the second translational direction 52. The force applied by the second compression washer 72 to the test plug/crossover 62 increases the friction between the threads of the test plug/crossover and the corresponding threads of the lower end cap, thereby increasing resistance to rotation of the test plug/crossover 62 in the first rotational direction 38. As a result, the possibility of the test plug/crossover 62 rotating in the first rotational direction in response to vibration and/or rotation of the valve assembly is substantially reduced or eliminated, thereby substantially reducing or eliminating the possibility of unintentional separation of the test plug/crossover from the lower end cap. Rotation of the test plug/crossover 62 in the second rotational direction is blocked by contact between the test plug/crossover 62 and the second compression washer 72.

Figure 4:
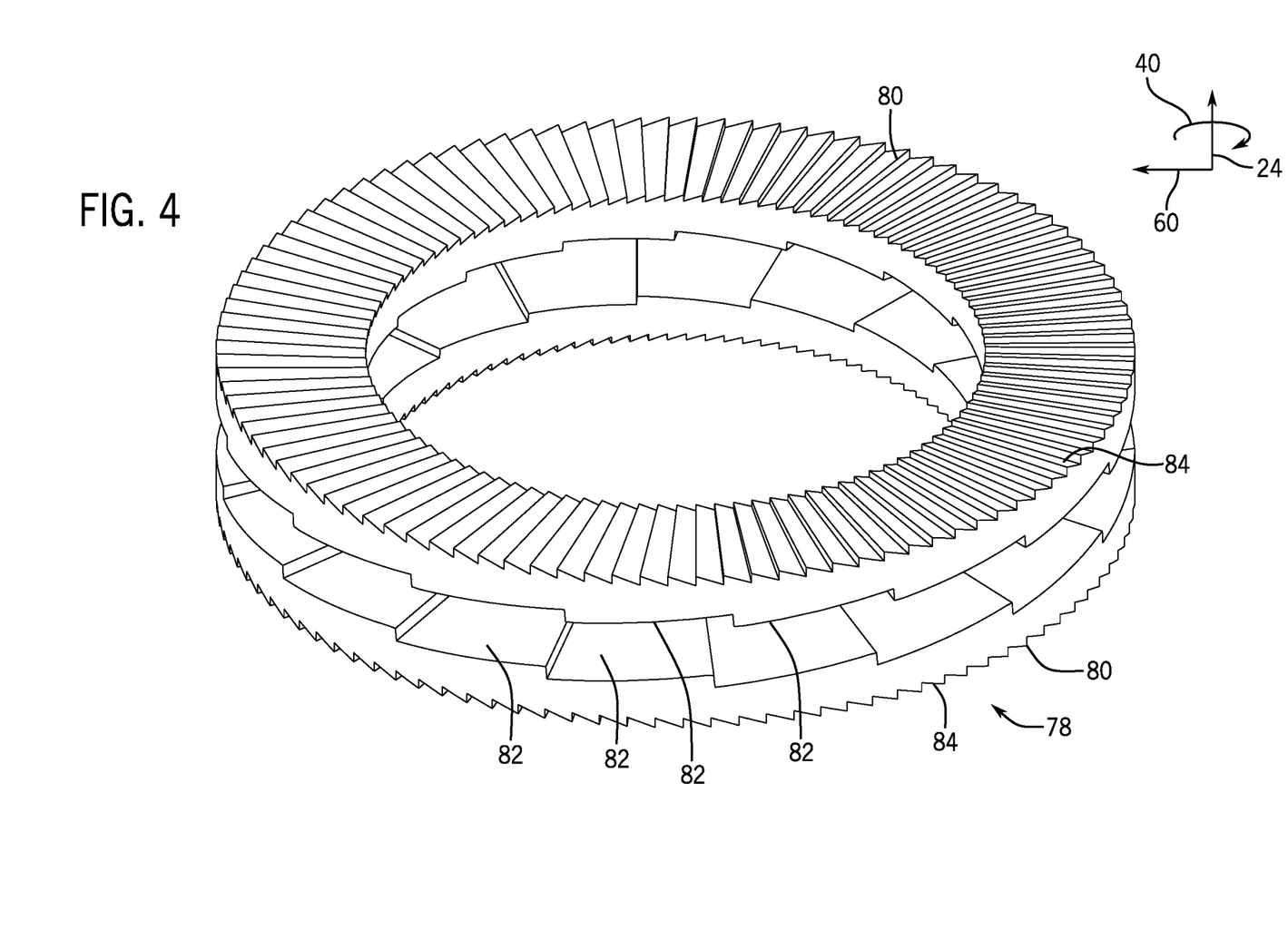
FIG. 4 is a perspective view of an embodiment of a wedge-lock washer that may be employed within the connection system of FIG. 2.

FIG. 4 is a perspective view of an embodiment of a wedge-lock washer 78 that may be employed within the connection system of FIG. 1. For example, the first compression washer(s) may include a wedge-lock washer, and/or the second compression washer(s) may include a wedge-lock washer, such as a NORD-LOCK® washer manufactured by Nord-Lock International AB. As illustrated, the wedge-lock washer 78 includes a pair of disks 80. Each disc 80 includes wedges 82 on an inward facing surface of the disk, and the wedges 82 of one disk are configured to engage corresponding wedges 82 of the opposing disk. In addition, each disc 80 includes protrusions 84 on the outward facing surface of the disk (e.g., side of the wedge-lock washer). The protrusions 84 are configured to engage the turnbuckle/test plug/crossover as the turnbuckle/test plug/crossover contacts the wedge-lock washer 78. Due to the engagement between the protrusions 84 and the turnbuckle/test plug/crossover, continued rotation of the turnbuckle/test plug/crossover drives a respective disc to rotate. Rotation of the disc and increasing longitudinal force applied by the turnbuckle/test plug/crossover drives the wedges on each disc to engage one another, thereby compressing the wedge-lock washer. As a result, a longitudinal force is applied to the turnbuckle/test plug/crossover. In addition, the protrusions 84 engage the respective component(s) to further reduce the possibility of rotation of one component relative to the other component. While the protrusions are on both sides of the wedge-lock washer in the illustrated embodiment, in other embodiments, the protrusions may be on a single side of the wedge-lock washer (e.g., the side facing the turnbuckle/test plug/crossover), or the protrusions may be omitted.

Figure 5:
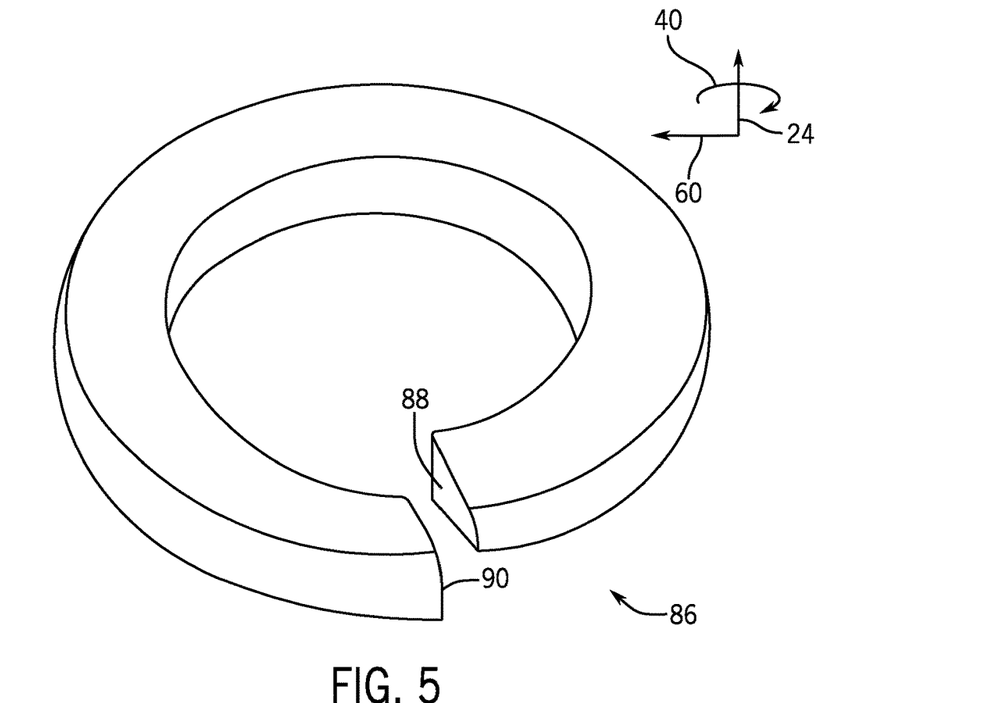
FIG. 5 is a perspective view of an embodiment of a helical spring washer that may be employed within the connection system of FIG. 2.

FIG. 5 is a perspective view of an embodiment of a helical spring washer 86 that may be employed within the connection system of FIG. 1. For example, the first compression washer(s) may include a helical spring washer, and/or the second compression washer(s) may include a helical spring washer. As illustrated, the helical spring washer 86 includes a first end 88 and a second end 90. The first end 88 is longitudinally offset from the second end 90 while the helical spring washer 86 is uncompressed. Compression of the helical spring washer 86 drives the ends toward one another along the longitudinal axis 24. While compressed, the helical spring washer applies a longitudinal force to the turnbuckle/test plug/crossover due to the tendency of the helical spring washer 86 to return to the uncompressed state. In certain embodiments, the helical spring washer may include protrusions on at least one side of the helical spring washer. The protrusions may engage the respective component(s) to further reduce the possibility of rotation of one component relative to the other component.

Figure 6:
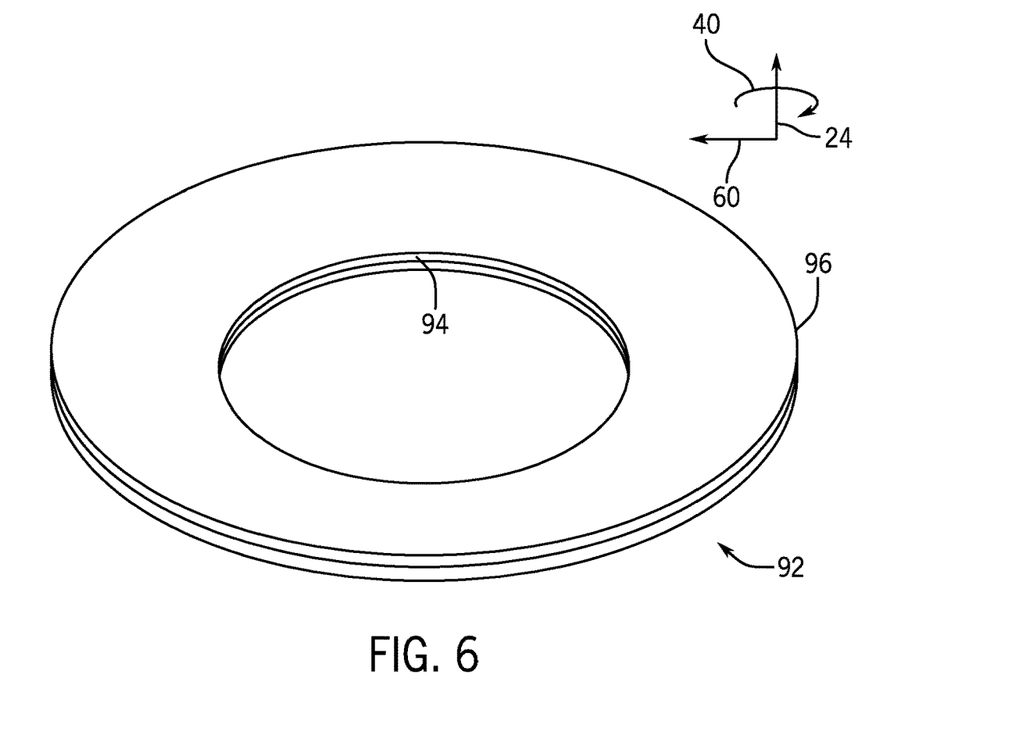
FIG. 6 is a perspective view of an embodiment of a conical washer that may be employed within the connection system of FIG. 2.

FIG. 6 is a perspective view of an embodiment of a conical washer 92 that may be employed within the connection system of FIG. 1. For example, the first compression washer(s) may include a conical washer, and/or the second compression washer(s) may include a conical washer. As illustrated, an inner portion 94 of the conical washer 92 is longitudinally offset from an outer portion 96 of the conical washer 92 while the conical washer 92 is uncompressed. Compression of the conical washer 92 drives the inner and outer portions toward one another along the longitudinal axis 24. While compressed, the helical spring washer applies a longitudinal force to the turnbuckle/test plug/crossover due to the tendency of the helical spring washer 92 to return to the uncompressed state. In certain embodiments, the conical washer may include protrusions on at least one side of the conical washer. The protrusions may engage the respective component(s) to further reduce the possibility of rotation of one component relative to the other component.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A connection system, comprising:
a turnbuckle having a first set of threads and a second set of threads disposed on an inner surface of the turnbuckle, wherein the turnbuckle is configured to couple two threaded components to one another via rotation of the turnbuckle in a first direction; and
a compression washer configured to compress as the turnbuckle rotates in the first direction, wherein the compression washer is configured to apply a longitudinal force to the turnbuckle while the compression washer is compressed to increase resistance to rotation of the turnbuckle in a second direction, opposite the first direction.

2. The connection system of claim 1, wherein the first set of threads comprises stub Acme threads, and the second set of threads comprises stub Acme threads.

3. The connection system of claim 1, wherein the compression washer comprises a helical spring washer.

4. The connection system of claim 1, wherein the compression washer comprises a conical washer.

5. The connection system of claim 1, wherein the compression washer comprises a wedge-lock washer.

6. The connection system of claim 1, wherein the compression washer comprises a plurality of protrusions on at least one side of the washer.

7. The connection system of claim 1, comprising a radial set screw extending through the turnbuckle and configured to engage one of the two threaded components.

8. A connection system, comprising:
a first component having threads disposed on an outer surface of the first component;
a second component having threads disposed on an outer surface of the second component;
a turnbuckle having a first set of threads and a second set of threads disposed on an inner surface of the turnbuckle, wherein the first set of threads is configured to engage the threads of the first component, the second set of threads is configured to engage the threads of the second component, and the turnbuckle is configured to couple the second component to the first component via rotation of the turnbuckle in a first direction; and
a compression washer disposed about the first component, wherein the compression washer is configured to compress between the turnbuckle and a shoulder of the first component as the turnbuckle rotates in the first direction, and the compression washer is configured to apply a longitudinal force to the turnbuckle while the compression washer is compressed to increase resistance to rotation of the turnbuckle in a second direction, opposite the first direction.

9. The connection system of claim 8, wherein the first set of threads comprises stub Acme threads, and the second set of threads comprises stub Acme threads.

10. The connection system of claim 8, wherein the compression washer comprises a helical spring washer, a conical washer, or a wedge-lock washer.

11. The connection system of claim 8, wherein the compression washer comprises a plurality of protrusions on at least one side of the washer.

12. The connection system of claim 8, comprising a radial set screw extending through the turnbuckle and configured to engage the first component.

13. The connection system of claim 8, comprising a third component having threads disposed on an outer surface of the third component, wherein one component of the first component or the second component has threads on an inner surface of the one component, and the threads on the outer surface of the third component are configured to engage the threads on the inner surface of the one component to couple the third component to the one component.

14. The connection system of claim 13, comprising a second compression washer disposed about the one component or the third component, wherein the second compression washer is configured to compress between the one component and the third component as the third component rotates in one of the first direction or the second direction, and the second compression washer is configured to apply a second longitudinal force to the third component while the second compression washer is compressed to increase resistance to rotation of the third component in the other of the first direction or the second direction.

15. The connection system of claim 14, wherein the second compression washer comprises a helical spring washer, a conical washer, or a wedge-lock washer.

16. A method of coupling a first component to a second component, comprising:
    disposing a compression washer about the first component, wherein the first component has threads disposed on an outer surface of the first component;
    engaging a first set of threads on an inner surface of a turnbuckle with the threads of the first component;
    engaging a second set of threads on the inner surface of the turnbuckle with threads of the second component, wherein the threads of the second component are disposed on an outer surface of the second component;
    rotating the turnbuckle in a first direction to move the turnbuckle toward the compression washer and to move the second component toward the first component, such that the turnbuckle compresses the compression washer;
    wherein compressing the compression washer causes the compression washer to apply a longitudinal force to the turnbuckle to increase resistance to rotation of the turnbuckle in a second direction, opposite the first direction.

17. The method of claim 16, wherein the compression washer comprises a helical spring washer, a conical washer, or a wedge-lock washer.

18. The method of claim 16, wherein the first set of threads comprises stub Acme threads, and the second set of threads comprises stub Acme threads.

19. The method of claim 16, wherein the compression washer comprises a plurality of protrusions on at least one side of the washer.

20. The method of claim 16, comprising disposing a radial set screw through the turnbuckle such that the radial set screw engages the first component.

\* \* \* \* \*